United States Patent
Elor et al.

(10) Patent No.: US 10,872,236 B1
(45) Date of Patent: Dec. 22, 2020

(54) LAYOUT-AGNOSTIC CLUSTERING-BASED CLASSIFICATION OF DOCUMENT KEYS AND VALUES

(71) Applicant: Amazon Technologies, Inc., Seattle, WA (US)

(72) Inventors: Hadar Averbuch Elor, Ra'anana (IL); Oron Anschel, Haifa (IL); Or Perel, Tel Aviv (IL); Amit Adam, Haifa (IL); Shai Mazor, Binyamina (IL); Rahul Bhotika, Bellevue, WA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 16/147,018

(22) Filed: Sep. 28, 2018

(51) Int. Cl.
*G06K 9/00* (2006.01)
*G06K 9/62* (2006.01)

(52) U.S. Cl.
CPC ....... *G06K 9/00456* (2013.01); *G06K 9/6223* (2013.01); *G06K 9/6256* (2013.01)

(58) Field of Classification Search
CPC . G06K 9/00456; G06K 9/6256; G06K 9/6223
USPC ........................................................ 382/159
See application file for complete search history.

(56) References Cited

U.S. PATENT DOCUMENTS

| 9,348,920 | B1 | 5/2016 | Kesin |
| 9,477,777 | B2 | 10/2016 | Stankiewicz |
| 9,485,265 | B1 | 11/2016 | Saperstein et al. |
| 10,318,630 | B1 | 6/2019 | Kesin et al. |
| 10,410,136 | B2 | 9/2019 | Zhang et al. |
| 10,437,837 | B2 | 10/2019 | Wang et al. |
| 10,452,651 | B1 | 10/2019 | Palou |
| 2005/0065975 | A1 | 3/2005 | McDonald |
| 2005/0182736 | A1 | 8/2005 | Castellanos |
| 2007/0061755 | A1 | 3/2007 | Taboada et al. |
| 2007/0168382 | A1* | 7/2007 | Tillberg ............. G06K 9/00449 |
| 2011/0099133 | A1 | 4/2011 | Chang et al. |
| 2015/0032645 | A1 | 1/2015 | McKeown et al. |
| 2016/0036460 | A1 | 2/2016 | Mattisson et al. |
| 2016/0364608 | A1 | 12/2016 | Sengupta et al. |
| 2019/0311301 | A1* | 10/2019 | Pyati .................. G06Q 30/0631 |

(Continued)

OTHER PUBLICATIONS

Lerman "Using the Structure of Web Sites for Automatic Segmentation of Tables" SIGMOD 2004 Proceedings of the ACM SIGMOD International Conference on Management Data, France, Jun. 13-18, 2004; New York, NY:ACM, US, Jun. 13, 2004, pp. 119-130.*

(Continued)

*Primary Examiner* — Juan A Torres
(74) *Attorney, Agent, or Firm* — Nicholson De Vos Webster & Elliott, LLP

(57) ABSTRACT

Techniques for layout-agnostic clustering-based classification of document keys and values are described. A key-value differentiation unit generates feature vectors corresponding to text elements of a form represented within an electronic image using a machine learning (ML) model. The ML model was trained utilizing a loss function that separates keys from values. The feature vectors are clustered into at least two clusters, and a cluster is determined to include either keys of the form or values of the form via identifying neighbors between feature vectors of the cluster(s) with labeled feature vectors.

20 Claims, 11 Drawing Sheets

(56) References Cited

U.S. PATENT DOCUMENTS

2020/0074169 A1* 3/2020 Mukhopadhyay .......................... G06K 9/00449

OTHER PUBLICATIONS

Lerman, Kristina et al; "Using the Structure of Web Sites for Automatic Segmentation of Tables" SIGMOD 2004 Proceedings of the ACM SIGMOD International Conference on Management Data, France, Jun. 13-18, 2004; New York, NY:ACM, US, Jun. 13, 2004, pp. 119-130.

International Search Report and Written Opinion for International Application No. PCT/US2019/062541, dated Mar. 12, 2020, 16 pages.

Non-Final Office Action for U.S. Appl. No. 16/198,040, dated Jul. 20, 2020, 10 pages.

* cited by examiner $$\text{Loss}(x) = \mathbb{E}_{\mathbf{p}_i,\mathbf{p}_j \sim U[0,1]^2} \left[ \mathbb{1}\{y_i = y_j\} \cdot \left\| f_\theta(x_{\mathbf{p}_i}) - f_\theta(x_{\mathbf{p}_j}) \right\|^2 \right.$$
$$\left. + \mathbb{1}\{y_i \neq y_j\} \cdot \exp\left\{ -\frac{1}{2\sigma^2} \left\| f_\theta(x_{\mathbf{p}_i}) - f_\theta(x_{\mathbf{p}_j}) \right\|^2 \right\} \right]$$

FIG. 3

LAYOUT-AGNOSTIC CLUSTERING-BASED CLASSIFICATION OF DOCUMENT KEYS AND VALUES

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which:

FIG. 3 is a diagram illustrating an exemplary grouping loss function useful for training one or more machine learning models of a key-value differentiation unit according to some embodiments.

DETAILED DESCRIPTION

Figure 1:
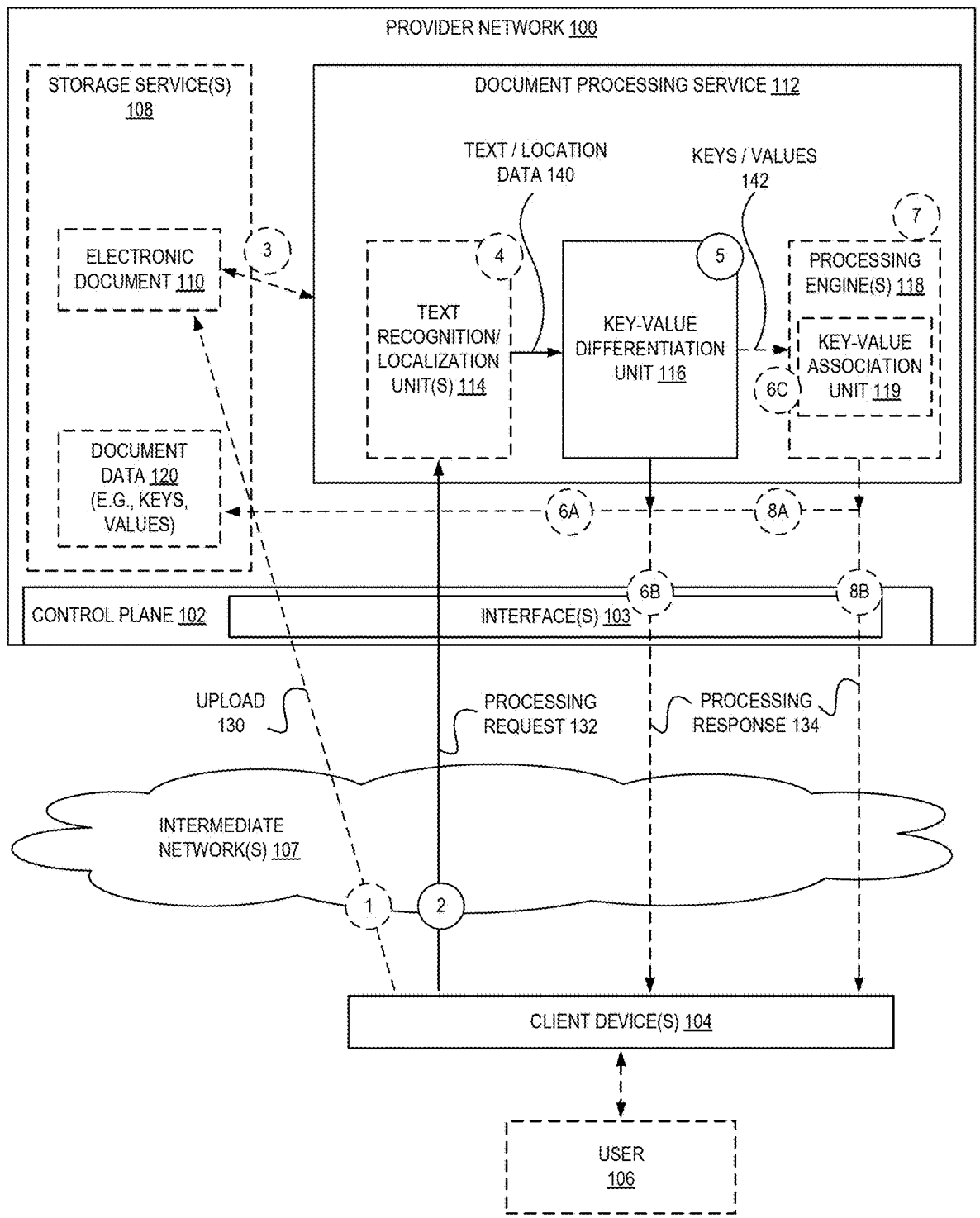
FIG. 1 is a diagram illustrating an example of an environment including a key-value differentiation unit providing layout-agnostic clustering-based classification of document keys and values according to some embodiments.

Various embodiments of methods, apparatus, systems, and non-transitory computer-readable storage media for layout agnostic clustering-based classification of document keys and values are described. According to some embodiments, a key-value differentiation unit can identify which words or phrases of an electronic document are key fields and which words or phrases are key values. The key-value differentiation unit generates feature vectors for detected text elements from a document using a machine learning model that was trained to cause feature vectors for key fields to be separated from key values. The feature vectors are clustered into two clusters. For values of each cluster, neighbors (e.g., nearest neighbors) can be identified from a labeled set of feature vectors, and based on the labels of the neighbors from each cluster, the identity of each cluster is determined. Accordingly, the key-value differentiation unit can programmatically determine which text elements from a document are keys and which text elements from a document are values, even when the key-value differentiation unit has not been trained using the particular document.

Techniques from the field of machine learning (ML) are being adapted in a variety of fields for a variety of purposes. For example, using ML to analyze images to detect the existence and locations of objects is one such application. Another application includes analyzing images (that carry a representation of a document) to identify what text is within the document, the structure of text within the document, and relationships between text within the document. For example, to implement a document processing service, numerous types of ML models may be utilized to analyze digital documents seeking to, for example, identify where text is represented within an image representation of a document and identify what that text is.

However, performing such operations on images carrying a representation of a form—especially when a ML model has not been trained to "understand" a particular form—remains a difficult task. For example, identifying the various components in a document that contains a form is problematic. In some cases, a form schema that contains the various form keys (e.g., "first name", "last name", "address", etc.) is available, but the actual form layout may vary across different forms. In other cases, a form schema may not even exist. Although some optical character recognition (OCR) tools can successfully identify some of the words contained in documents, identifying and classifying these words in the context of forms is not trivial due to various noises and nuisances, including outlier detections and ambiguity in classification (for example, the word "name" may appear multiple times).

For example, with regard to governmental documents (e.g., W2s), there may be tens or hundreds of millions of people that fill out a same or similar form. Thus, it would be advantageous to find a way to automatically extract that data.

Prior systems attempt to extract entered form data by, for example, obtaining an image of a form (e.g., scanning a form) and trying to analyze it based on some defined layout (or "template") that is defined in advance. Thus, using knowledge of where a particular field is, the system can look in that defined place to find the value—e.g., look in a box at a particular coordinate within a document for a "name." However, when the layout of the form changes, the system breaks until someone can configure the system with the details of the "new layout" to thereafter be able to process that form—for example, people have to update mappings, and the system needs to know which one of the mappings needs to be used. This problem is further complicated in that there can be dozens of different layouts for a same form, new forms can be introduced all the time, etc., and thus this approach doesn't scale.

However, embodiments provide an automatic layout-free system that understands where in the form are the keys and where in the form are the values. Thus, embodiments no longer necessarily need to have explicit knowledge of the form in advance but can instead intelligently analyze the form to detect where the keys and values are located without using some template-matching approach.

Accordingly, as introduced above, embodiments disclosed herein provide a system for automatically classifying detected words in an electronic document (including a representation of a form) as being part of a "form key" (or "attribute") or alternatively being a "form value" (e.g., a value pertaining to a corresponding form key—a form value of "Green" may be associated with a form key of "color," and a form value of "January" may be associated with a form key of "month", etc.) The classification allows for further analysis of the elements of the form and a richer understanding of the detected content. Embodiments described herein utilize a ML-based system that groups words into clusters. The clustering is performed using a deep-learning network that can be trained on synthetic forms, and clusters words or phrases based on feature vector representations of the words or phrases. The distance of each candidate cluster to one of the given form keys is estimated. A maximum weight matching in bipartite graphs may be solved to find a best key-cluster assignment. Accordingly, words that belong to the assigned clusters are classified into the corresponding form keys, while the remaining words can be classified as values.

FIG. 1 is a diagram illustrating an example of an environment including a key-value differentiation unit 116 providing layout-agnostic clustering-based classification of document keys and values according to some embodiments. In this example, the key-value differentiation unit 116 is a component of a document processing service 112 that may be implemented using software executed by one or multiple computing devices, and in various embodiments could be implemented in hardware or a combination of both hardware and software. For example, in some embodiments, such as when the key-value differentiation unit 116 is implemented as a component or part of a service (e.g., document processing service 112) within a provider network 100 and needs to operate in large scale to process substantial numbers of requests, the key-value differentiation unit 116 (and/or document processing service 112) may be implemented in a distributed manner—e.g., using software executed by multiple computing devices in a same or different geographic location(s).

A provider network 100 provides users with the ability to utilize one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 (e.g., user 106) may utilize one or more user accounts that are associated with a customer account, though these terms may be used somewhat interchangeably depending upon the context of use. Users may interact with a provider network 100, via use of a client device 104 (e.g., a personal computer (PC), a mobile device such as a tablet or cellular phone, a "smart" device such as a smart speaker or camera, a server computing device, etc.), across one or more intermediate networks 107 (e.g., the internet) via one or more interface(s) 103. For example, the user 106 may interact with (or configure) the client device(s) 104 to send requests as application programming interface (API) calls, which may occur via the user 106 utilizing a console implemented as a website or application, etc. The interface(s) 103 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, the document processing service 112 in some embodiments is implemented via software, and includes a number of sub-components that may also be implemented in whole or in part using software—a text recognition/localization unit 114, the key-value differentiation unit 116, and optionally one or more processing engines 118 (e.g., a key-value association unit 119), which may be a part of the document processing service 112 or potentially another service within the provider network 100.

The document processing service 112 may perform various functions upon data representing documents. For example, the document processing service 112 may identify text represented within an image and process the text in intelligent ways, e.g., based on where the text is located within the representation.

As used herein, the term "text" is typically used to refer to alphanumeric data—e.g., a alphabetic and/or numeric characters, which may include Latin letters, Arabic digits, punctuation marks, symbols, characters from other character sets, etc. For example, "text" may include Unicode characters (e.g., currently 137,439 characters covering 146 modern and historic scripts, as well as multiple symbol sets and emoji). Thus, the term "text" is to be understood broadly and is not meant to be limited to only "letters" unless otherwise indicated by the context of use.

To utilize the document processing service 112, a user 106 may utilize a client device 104 to obtain (e.g., download, capture via a camera/optical sensor, etc.) an electronic document 110. The electronic document 110 may be a digital file storing a representation of a document such as a form. For example, the electronic document 110 may be a Portable Document Format (PDF) file, a word processing document such as a Word™ document or Open Document Format (ODF) file, an image including a representation of a document (e.g., a JPG, GIF, PNG), etc.

Optionally, the user 106 may upload 130 the electronic document 110 (e.g., a digital image) to a location that is distinct from the document processing service 112 at circle (1). For example, the user 106 may cause the electronic device 104 to send the electronic document 110 to be stored at a location of a storage service 108 within (or alternatively, outside of) the provider network 100. The storage service 108 may provide, in a non-illustrated response message, an identifier of the electronic document 110 (e.g., a Uniform Resource Locator (URL) for the file, a unique identifier of the file within the context of the storage service 108 or provider network 100, a name of a folder (or storage "bucket" or group) that includes the file, etc.

At circle (2), the user 106 may utilize a client device 104 to cause it to send a processing request 132 to the document processing service 112. The processing request 132 may indicate the user's desire for the document processing service 112 to process a particular electronic document 110 (or group of electronic documents) in some particular manner.

For example, the processing request 132 may indicate that text of a form represented within the electronic document(s) 110 is to be identified, and that text "values" corresponding to text "keys" within the form are to be identified, stored, and/or processed in some manner. As one example, an electronic document 110 may comprise an image file that was captured by an optical sensor of a scanner device or a user's mobile device, where the image file is a picture of a form such as a government-issued form document (e.g., a W2 form, a tax return form, etc.), a form provided by a company (e.g., a product order form, an employment application, etc.), or other type of form. Thus, the processing request 132 may indicate a request to identify data values entered within the form—e.g., a number (the value) of years of experience (the key) entered into an employment application—and store those values (e.g., within a database, which may have columns/keys corresponding to form keys), process those values (e.g., using a special purpose script, application, or set of rules), etc.

The processing request 132 may include (or "carry") the electronic document 110 or may include an identifier of an electronic document 110 (e.g., a URL). In a use-case where the processing request 132 includes the electronic document 110, the document processing service 112 may optionally at circle (3) store the electronic document 110 via a storage service 108. In a use-case where the processing request 132 identifies the electronic document 110, the document processing service 112 may obtain the electronic document 110 at circle (3) based on the identifier (e.g., by sending a HyperText Transfer Protocol (HTTP) GET request destined to a provided URL).

To process the electronic document 110, at circle (4) the text recognition/localization unit 114 may operate upon the electronic document 110 to identify locations of text within the document. The text recognition/localization unit 114 may comprise, for example, an object detection machine learning model trained to identify locations of characters, words, lines of text, paragraphs, etc., as is known to those of skill in the art. The text recognition/localization unit 114 can identify the locations of the text in the form of bounding boxes, coordinates, etc. The text recognition/localization unit 114 can also identify the text itself within the electronic document 110. This identification may include using the locations identified, and may include performing an optical character recognition (OCR) process upon these locations. Alternatively, the text recognition/localization unit 114 may simply perform an OCR process that may not include a separate location detection phase.

However, in some embodiments the text recognition/localization unit 114 may utilize different techniques to achieve the same result. For example, the electronic document 110 may potentially be a PDF file already including the text within the document (instead of just carrying a "flat" image alone), and the text recognition/localization unit 114 may identify this text and also identify the locations of that text (e.g., from the PDF metadata, from its own object detection or matching model, etc.).

At this stage, text has been detected as being represented within the electronic document 110, and locations of the text have similarly been detected. However, when the electronic document 110 is a form—and especially a "new" form that has not yet been observed—there is no knowledge of which text elements are "keys" of the form and which are "values." As is known, a form may include one or more keys such as "first name," "last name," "full name," "address," "amount," "value," etc., and the completed form may have values for one or more (or possibly all) of these keys—e.g., "Dominic," "200.50," "Samuel," etc. To be able to act upon this data in a programmatic and intelligent way, it is imperative to determine which text elements are keys and which are values.

The detected text elements and location data 140 are provided to the key-value differentiation unit 116, which can operate on portions (or all) of the electronic document 110 at circle (5) with this provided information to determine which of the text elements are keys and which of the text elements are values. The detected text elements and location data 140 may be provided by sending this data (e.g., within files, or within a "string" or "blob" of text) directly to the key-value differentiation unit 116, by storing this data in a known storage location (e.g., by storage service 108) that the key-value differentiation unit 116 is configured to look in, by sending an identifier of such a location to the key-value differentiation unit 116, etc. Similarly, the electronic document 110 itself may be passed according to similar techniques together with or separate from the detected text elements and location data 140.

The key-value differentiation unit 116 operates by generating a feature vector for each text element (e.g., word or phrase) using one or more specially-trained machine learning (ML) models. The feature vectors created for each text element of a particular electronic document 110 are clustered into (at least) two different groups. The key-value differentiation unit 116 can then use labeled feature vectors (indicating whether corresponding text elements are keys or values) to determine which cluster includes feature vectors corresponding to "key" text elements and/or "value" text elements. The labeled feature vectors may have been provided/used during the training of the ML model(s), could be "actual" keys and values previously determined by the key-value differentiation unit 116 (and confirmed as being accurately detected), or a combination of both. Additional details regarding the training and utilization of the one or more ML models will be provided herein with reference to FIG. 2-FIG. 5.

When the text elements that are keys and/or the text elements that are values (or "keys/values 142") are determined, the keys/values 142 may be used in numerous ways.

For example, as shown by optional circle (6A), the keys/values 142 may be stored via one or more storage services 108 as document data 120. As one example, a representation of the keys and values may be generated (e.g., in JavaScript Object Notation (JSON) or eXtensible Markup Language (XML) format, as a string or blob of text, etc.) and stored as a file or as a database entry. The representation could be, for example, a "keys" element (e.g., an array or mapping) associated with a listing of all of the keys found—e.g., "keys": {"Name," "Address," "Phone Number" }—and/or a "values" element associated with a listing of all values found—e.g., "values": {"+1-123-456-7890", "Gianna Rose", "2 Central Plaza"}. As another example, the values could be stored as a database entry At this stage, the keys and values may or may not be aligned and thus may or may not correspond to one another—here, a first key of "Name" does not appear to correspond to the first value, which may be a phone number.

Additionally, or alternatively, at optional circle (6B) the keys/values 142 information may be provided to an external (to the provider network 100) destination such as a client device 104 of the user 106, possibly within a processing response message 134, which may or may not be responsive to the processing request 132. For example, the processing response message 134 may be sent as part of a session of communication where the user 106 utilizes a client device 104 to interact with the document processing service 112 via a web application (and thus, via a web endpoint interface 103).

Additionally, or alternatively, at optional circle (6C) the keys/values 142 information may be provided to one or more processing engines 118, which may be a part of the document processing service 112 or another service (of the provider network 100, or even external to the provider network 100). A processing engine 118 may be adapted to process the keys/values 142 information (and/or electronic document 110, text/location data 140, etc.) at circle (7) for a desired purpose specific to the implementing entity. For example, a processing engine 118 such as a key-value association unit 119 may combine ones of the keys with ones of the values, e.g., based on detecting a key or value having a "nearby" (in terms of coordinates) match from the other type (key or value). Additionally, or alternatively, the processing engine 118 may generate a report based on the detected keys and/or values, store the keys and/or values at optional circle (8A) as document data 120 via a storage service 108, send the keys and/or values (or report, additional data, etc.) at optional circle (8B) as processing response 134.

Although these exemplary functions and units 114/116/119 are described as being utilized in a serial or sequential manner, in various embodiments these functions may be implemented in other ways known to those of skill in the art with the benefit of this disclosure. For example, in some embodiments the key-value association unit 119 may operate partially or completely in parallel with other processing units—e.g., the key-value differentiation unit 116. In other embodiments, the key-value association unit 119 and key-value differentiation unit 116 may be implemented as a combined unit and possibly benefit from the existence of common processing tasks needed by each thus needing to only be performed once. Thus, many variations of these techniques and implementations exist which are covered by various embodiments.

Figure 2:
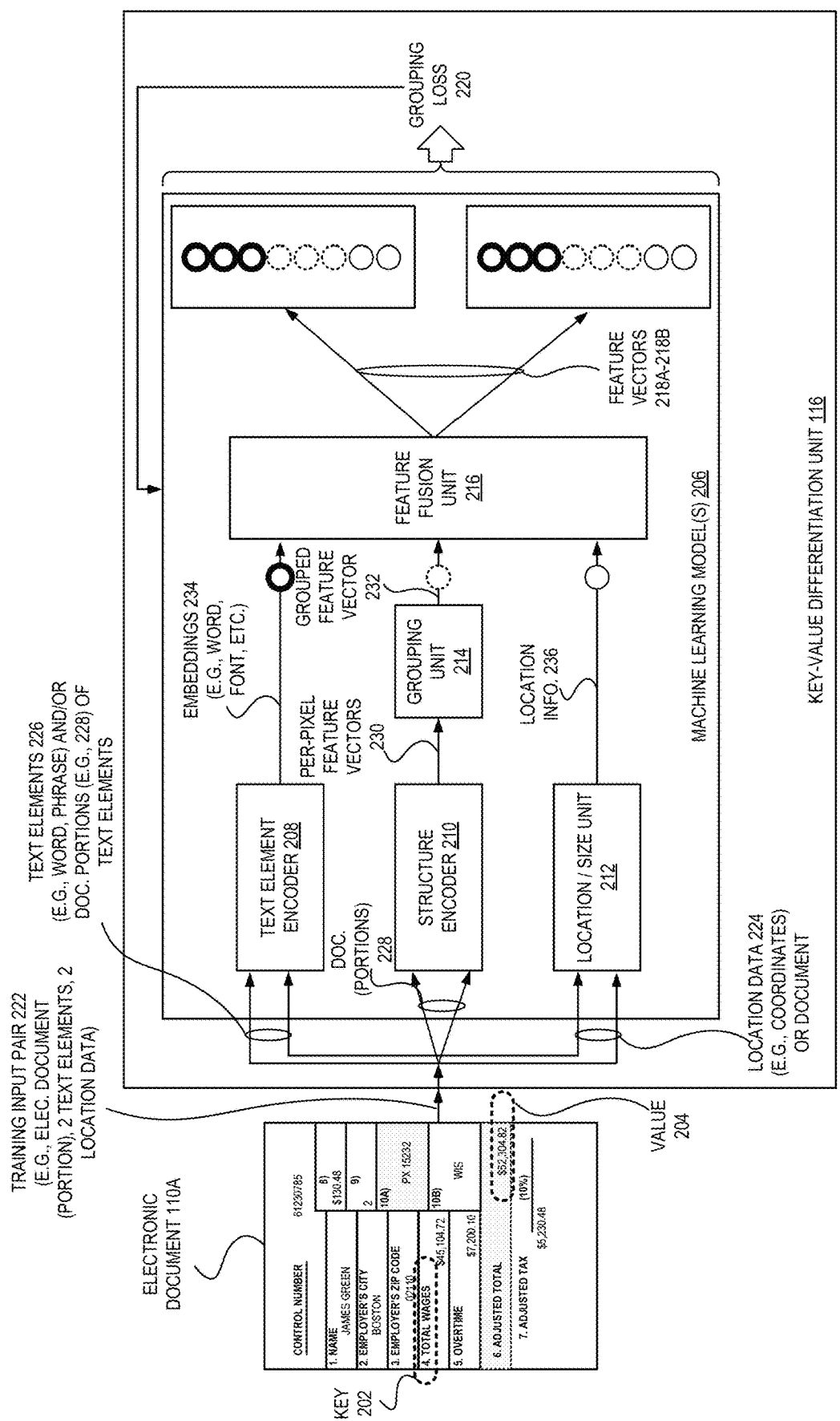
FIG. 2 is a diagram illustrating an example of training of one or more machine learning models of a key-value differentiation unit according to some embodiments.

For further detail regarding how the key-value differentiation unit 116 can operate to differentiate between text elements that are keys and text elements that are values, we turn to FIG. 2, which is a diagram illustrating an example of training of one or more machine learning models of a key-value differentiation unit according to some embodiments.

In this figure, an example electronic document 110A is shown that includes multiple keys and multiple values. For example, a key 202 is shown as "4. TOTAL WAGES" while a value 204 is shown as "$52,304.82". This electronic document 110A, and likely many other electronic documents (e.g., 110B-110Z) may be used to train one or more machine learning models 206 to generate feature vectors 218 that are "close" together for two keys or for two values, but which are "far apart" for a key and value, allowing for keys and values to be programmatically distinguished.

As indicated, a large amount of training data in the form of annotated electronic documents 110A-110Z may be obtained or generated. Each annotated electronic document 110 may include a set of annotations—e.g., one or more of: an identification of what areas of the document include keys or values (e.g., bounding boxes), an identification of what text elements are present in the document (e.g., string values), an identification of which of the text elements are keys or values, etc. In some embodiments, the machine learning model(s) 206 may be trained using synthetic documents, semi-synthetic documents (where the keys and/or layouts are real, though the values are not), or annotated real documents.

In some embodiments, the machine learning model(s) 206 are trained using an iterative process, where each iteration utilizes using a pair of text elements—e.g., a training input pair 222. The training input pair 222 may include a key and another key, a key and a value, or a value and another value. The training input pair 222 may include identifiers (e.g., coordinates, bounding box information, etc.) of the corresponding locations of the document—or the actual data making up those locations—that include the text element, the text of the text element, a label of whether the text element is a key or a value, etc.

The one or more machine learning model(s) 206 may comprise implement different branches of processing that may be executed in parallel, in series, or combinations thereof.

A first branch of the processing is performed by an text element encoder 208. The text element encoder 208 in some embodiments operates upon the pair 226 of the text elements to generate a word embedding 234 for each of the text elements (e.g., each word or phrase). Thus, the text element encoder 208 may operate on a word or phrase basis, and encode the semantic meaning of the word (e.g., an embedding for "first" may be relatively close to the embedding for "name", but will be far away from the embedding for "0.20").

A word embedding is commonly used to refer to an output generated by any of a set of language modeling and feature learning techniques in natural language processing (NLP), in which words or phrases from a vocabulary are mapped to vectors (e.g., of real numbers). Conceptually, generating a word embedding involves a mathematical embedding from a space with one dimension per word to a continuous vector space with a much lower dimension. Each word embedding may be generated by the text element encoder 208 using a variety of techniques known to those of skill in the art, such as a neural network, probabilistic models, etc.

For example, in some embodiments, the text element encoder 208 implements a word2vec model. Word2vec is a group of related models that are used to produce word embeddings. These models are often relatively shallow, two-layer neural networks that may be trained to reconstruct linguistic contexts of words. Word2vec may operate by producing an embedding for a text element within a vector space, potentially including several hundred dimensions, where each unique text element may be assigned a corresponding vector in the space. Word vectors are positioned in the vector space such that words that share common contexts in the corpus are located in close proximity to one another in the space. The processing may occur on a word-by-word basis, for example, and an embedding for each word in a text element may be combined (e.g., concatenated, possibly according to a consistent technique) into a single embedding 234.

Additionally, or alternatively, the text element encoder 208 may comprise one or more units (e.g., layers of a neural network) that can learn and generate font embeddings 234 for the visual aspects of the text elements 226 (e.g., the visual representation of the text elements within the electronic document 110A, such as a portion of an image including the text element(s)). In some cases, particular fonts or font styles (e.g., bold, italics, underline, etc.) may be utilized by keys and/or values, and this information can be "learned" by the text element encoder 208 and used to generate font-based embeddings. In some embodiments, the embeddings 234 include both font-based embeddings and also word embeddings, though in other embodiments the embeddings 234 include word embeddings or font-based embeddings but not both.

A second branch of the processing is performed by a structure encoder 210 using the electronic document 110A itself (together with identifiers/bounding boxes indicating where the text elements are) or portions 228 of the document including the text elements. The structure encoder 210 may comprise a convolutional neural network (CNN) having a decoder and an encoder, which may learn a feature vector 230 for each pixel of each text element. Each of the per-pixel feature vectors for a text element may then be "grouped" by a grouping unit 214, which may create a single grouped feature vector 232 for a text element. The grouping may be a concatenation, an averaging (or other statistical function), etc., based on the individual per-pixel feature vectors 230, and thus is associated with an entire text element.

A third branch of the processing is performed by a location/size unit 212, which may receive location data 224 (e.g., coordinates, bounding box information, etc.), and/or may self-detect such location information on a per-element (or per word, or per-phrase) basis. The location/size unit 212 may generate, using this provided and/or self-detected information, location information 236 indicating this data in a standard format. As one example, this information 236 can be beneficial as it may be the case that keys and values are in different font sizes, and thus the size of the representations of the text elements may be important to assist in differentiating between the height of the words.

A feature fusion unit 216 may operate to concatenate or consolidate all of these outputs from the three processing branches. This "combining" may or may not be simple concatenation. In some embodiments, the inputs are "compressed" (e.g., by additional layers in a neural network that make up the feature fusion unit 216) from a longer mapping into a shorter one by learning what is important for differentiation and separation (of keys and values) purposes. For example, in some usage scenarios it may become evident during training that features from the top branch (shown with a bold circle) are more important than features from the second branch (shown as a dashed linen circle) or features from the third branch (shown as a solid lined circle), so the feature fusion unit 216 may have the ability to learn that and encode the resulting feature vectors 218A-218B with different amounts of data taking from the three branches of inputs. This may occur, for example, by concatenating the three branches of inputs (e.g., the embeddings 234, grouped feature vector 232, and location information 236) and projecting this concatenated value into the resultant feature vector 218 (e.g., having a smaller dimensionality than the concatenated value). In this illustrated example, "three units" from the first branch are taken, "three units" from the second branch are taken, and only "two units" from the third branch are taken; all of which are somehow combined (e.g., consolidated or otherwise transformed) to result in the feature vectors 218A-218B for the pair of text elements.

Notably, although three processing branches are described in this example, in other embodiments more or fewer branches can be utilized. For example, in some embodiments only the "second" branch may be utilized, or in other embodiments only the first and second branches may be utilized, as a few examples.

Based on these feature vectors 218A-218B, the machine learning model(s) 206 will self-modify its features (e.g., using a grouping loss function 220) so that two feature vectors are "close" in the space if both correspond to keys or if both correspond to values, but be far apart if the vectors correspond to a key and a value.

For example, FIG. 3 is a diagram illustrating an exemplary grouping loss function 300 useful for training one or more machine learning models of a key-value differentiation unit according to some embodiments. In this example, x is the input image (e.g., electronic document 110A) and $P_i$ is the i-th pixel location in x. For the sake of simplicity, it is assumed that $P_i \in [0,1]^2$ (i.e., the image dimension is the unit square). Additionally, $\theta$ is the weights of the network and $f_\theta(x_{P_i}) \in \mathbb{R}$ is the output of the network (e.g., ML model) for the corresponding i-th pixel location in x, where d is the output dimension. Thus, the network is trained to minimize the loss function 300 shown in FIG. 3.

In the loss function 300, the expectation is taken over a uniform sampling strategy of pairs of pixels. The loss may be composed of a summation of two complementary terms. The first, for pixels belonging to the same label ($y_i = y_j$), drives the output embeddings $f_\theta(x_{P_i})$ and $f_\theta(x_{P_j})$ closer together. The second, for pixels with different labels ($y_i \neq y_j$), encourages a separation of the embedding vectors.

Thus, by training the ML models accordingly, the resultant feature vectors for keys and values will be relatively "far" apart, while the resultant feature vectors for keys will be relatively "near" each other and similarly the resultant feature vectors for values will also be relatively "near" each other.

Figure 4:
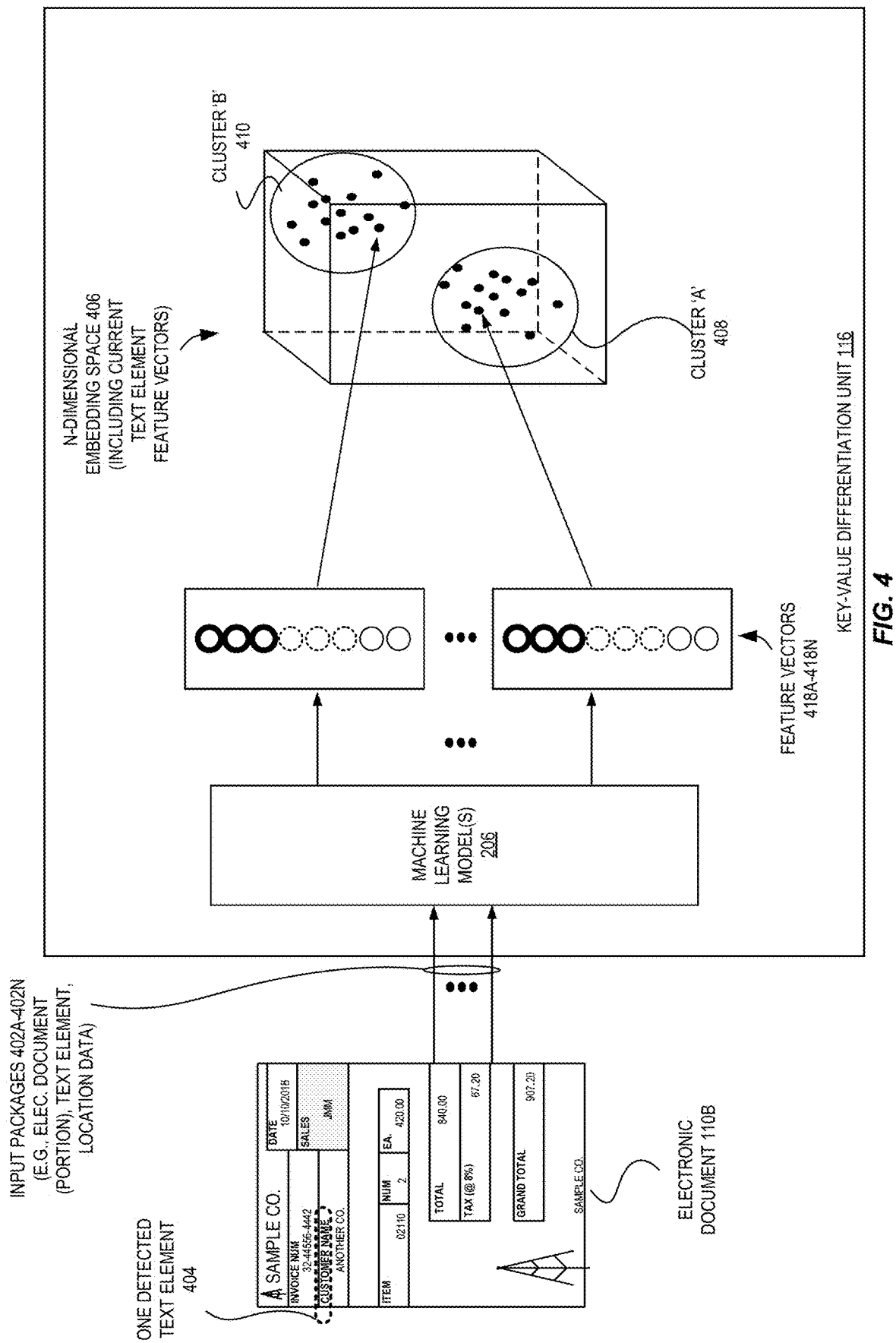
FIG. 4 is a diagram illustrating exemplary stages for inference performed by a key-value differentiation unit according to some embodiments.

For further understanding regarding the use of the key-value differentiation unit 116, FIG. 4 is a diagram illustrating exemplary stages for inference performed by a key-value differentiation unit according to some embodiments. In this example, another electronic document 110B (e.g., an image including a representation of a form document) is shown in which a number of text elements are detected. One such detected text element 404 is shown—"CUSTOMER NAME." At this point, the system is unaware of whether this text element and all other detected text elements are keys or values.

Thus, for each detected text element, an input package 402A-402N is provided to the key-value differentiation unit 116 for processing, which may include one or more of the entire electronic document 110B (or a portion thereof, such as a portion of the document—e.g., a 10 pixel by 90 pixel image—that includes the corresponding text element), the text element that was detected (e.g., in string form), any location data of the text element (e.g., coordinates, sizing information, a bounding box), etc.

The machine learning model(s) 206 operate upon this data for each text element to generate feature vectors 418A-418N. The key-value differentiation unit 116 may then cluster the feature vectors 418A-418N, e.g., using a clustering technique or algorithm known to those of skill in the art, such as (but not limited to) k-means, k-medoids, Gaussian mixture models, DBSCAN, OPTICS, etc. In some embodiments, the key-value differentiation unit 116 generates two clusters 408 and 410—one to include the keys, and one to the include the values. However, other embodiments may use more clusters, such as three or four (or more) clusters in an attempt to detect "faraway" feature vectors needing further analysis (e.g., that would be located in their own cluster, or with few other vectors) or to detect different classes of the text elements (e.g., a cluster for paragraphs, section titles, explanatory text, etc.). In the latter case, the key-value differentiation unit 116 may again be trained with pairs of text elements, but where the individual text elements may have more than two possible classes (i.e., instead of just being a key or a value, instead being a key or a value or some other class(es)). These feature vectors 418A-418N are shown in FIG. 4 as being represented as dots in a three-dimensional space for ease of visual understanding; however, it is to be understood that in many embodiments the vectors lie in a space of higher dimensionality and thus would lie in an n-dimensional space 406.

Figure 5:
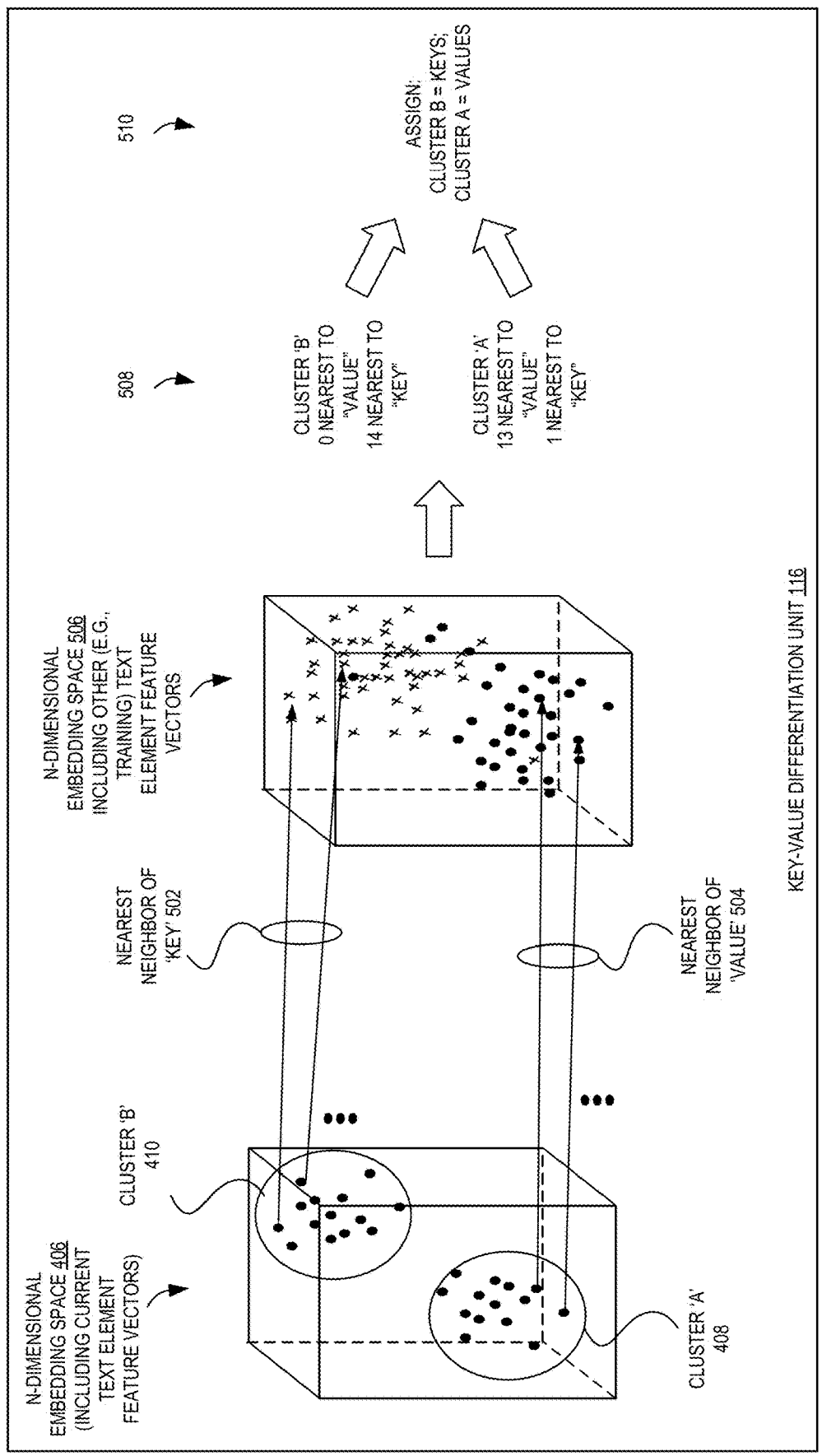
FIG. 5 is a diagram illustrating additional exemplary stages for inference performed by a key-value differentiation unit according to some embodiments.

With two (or more) clusters identified, we turn to FIG. 5, which is a diagram illustrating additional exemplary stages for inference performed by a key-value differentiation unit according to some embodiments.

In some embodiments, for one or more feature vectors of one of the clusters 408/410, a neighbor feature vector from a set of labeled feature vectors is found (e.g., using nearest neighbor techniques known to those of skill in the art, or using a bipartite matching technique such as a minimum weighted bipartite matching algorithm to identify an overall smallest distance between feature vectors of one or multiple clusters). The set of labeled feature vectors may include one or more of those feature vectors created during the training of the machine learning model(s) 206, previously-generated feature vectors, etc. The set of labeled feature vectors are labeled in that each vector is associated with a label of "key" or "value" (or other class(es), as indicated above).

For example, assume all labeled feature vectors are represented as "X" marks in the n-dimensional space 506. For two vectors in cluster B 410, corresponding nearest neighbors 502 are shown via arrows 502. It can then be determined that these corresponding nearest neighbors 502 have a same label of "key". Thus, in some embodiments, upon some number of vectors in a cluster being associated with a nearest neighbor having a same label, it can be determined that the cluster itself has the same label. In this case, cluster B 410 may thus take the label of "key."

This nearest neighbor determination may be performed only for one or multiple (or all) of the vectors in one cluster, and a most-frequently occurring label (from all nearest neighbors in the labeled set) may be chosen as the cluster label. In some embodiments, the nearest neighbor analysis need not be performed for the other cluster A 408, as it must take on the "other" label (e.g., "keys" when the other cluster is "values," "values" when the other cluster is "keys"). However, in some embodiments, this analysis is performed for both clusters 408/410 to ensure that both come up with an alternative label. (If both clusters were to arrive at a same label, for example, the process may halt and an error/alert may be generated.)

For example, as shown in FIG. 5, at 508 for cluster B there were 14 nearest neighbors 502 of "key" and 0 nearest neighbors of "value"; likewise, for cluster A there were 13 nearest neighbors 504 of "value" and 1 nearest neighbor of "key." Thus, as shown at 510, cluster B can be determined to be keys, and cluster A can be determined to be value. Thereafter, these labels can be imparted back to the corresponding text elements themselves.

Figure 6:
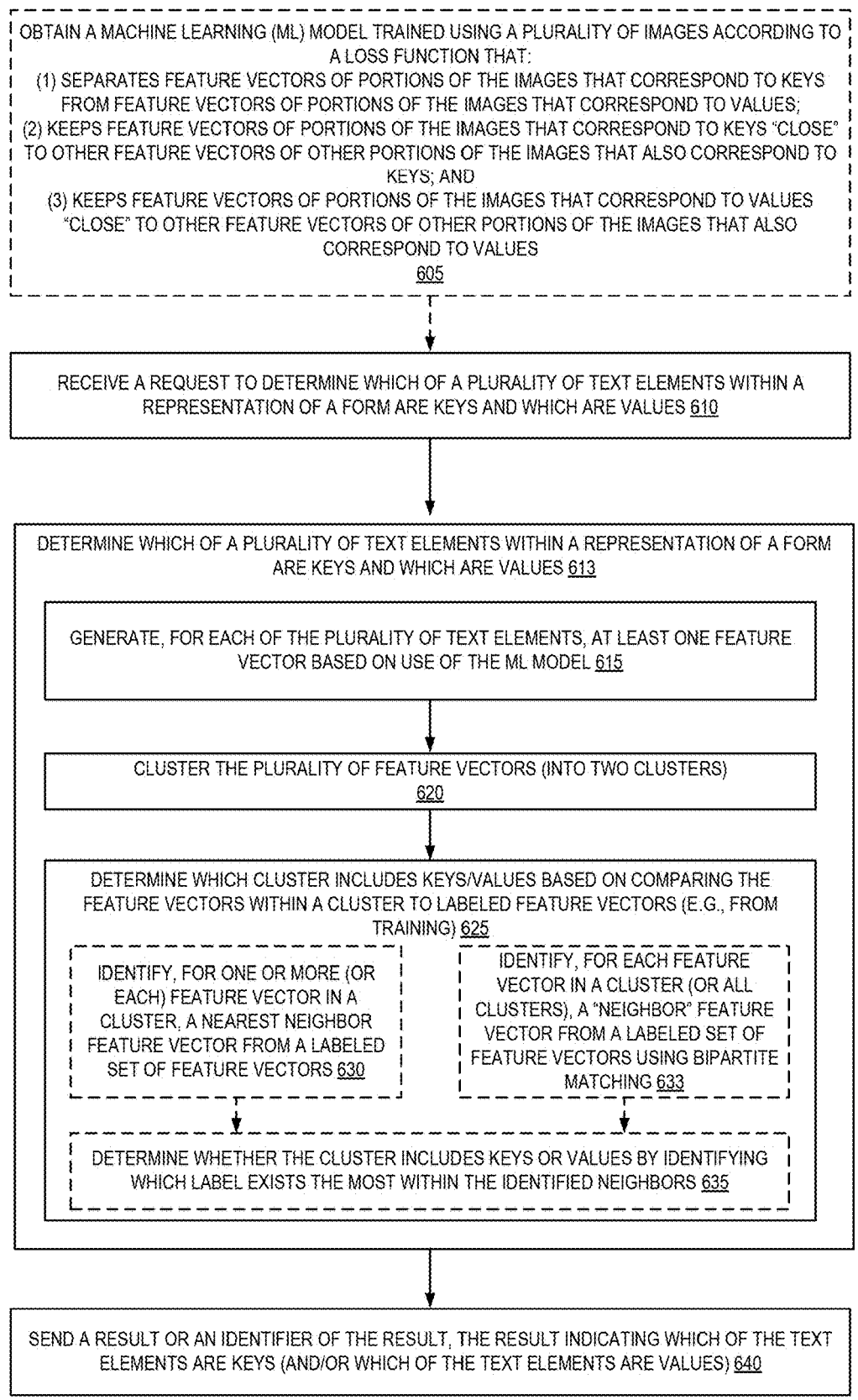
FIG. 6 is a flow diagram illustrating exemplary operations of a method for clustering-based classification of document keys and values according to some embodiments.

FIG. 6 is a flow diagram illustrating exemplary operations of a method for clustering-based classification of document keys and values according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the key-value differentiation unit 116 or the document processing service 112 of the other figures.

The operations 600 include, at block 605, obtaining one or more machine learning (ML) models trained using a plurality of images according to a loss function that (1) separates feature vectors of portions of the images that correspond to keys from feature vectors of portions of the images that correspond to values; (2) keeps feature vectors of portions of the images that correspond to keys "close" to other feature vectors of other portions of the images that also correspond to keys; and (3) keeps feature vectors of portions of the images that correspond to values "close" to other feature vectors of other portions of the images that also correspond to values. The ML model(s) may be the machine learning model(s) 206 described herein, e.g., using the grouping loss function 300 of FIG. 3. The ML model(s) may comprise one or more neural networks, and/or may include one or more processing branches.

The operations 600 include, at block 610, receiving a request to determine which of a plurality of text elements within a representation of a form (e.g., within an electronic image) are keys and which are values. The request may be made by another component within a system (e.g., a document processing service 112), and may be made via issuing an API call (e.g., via a web service call), a function call, or by placing a request within a queue. Thus, the request may be received by receiving an API call or function call invocation, receiving a request from a queue, etc. The request may include the representation of the form (e.g., an electronic document comprising an image) or an identifier of the representation (e.g., a URL or storage location identifier). The request may include the text elements themselves, and/or location or sizing information for the text elements (e.g., bounding boxes, coordinates, height/width information, etc.).

The operations 600 also include, at block 613, determining which of a plurality of text elements within a representation of a form are keys and which are values. In some embodiments, block 613 includes block 615 and thus generating, for each of the plurality of text elements, at least one feature vector based on use of the ML model. The generating may make use of the ML model(s) obtained in block 605 and may include use of one or more processing branches.

Block 613 may also include, at block 620, clustering the plurality of feature vectors. The clustering may place ones of the plurality of feature vectors into two clusters (that is, n=2) or into more than two clusters (e.g., n=3, n=4). The clustering may utilize a clustering algorithm known to those of skill in the art, e.g., k-means, k-medoids, DB-SCAN, OPTICS, etc.

Block 613 may also include, at block 625, determining which cluster includes keys/values based on comparing the feature vectors within a cluster to a set of labeled feature vectors. The set of labeled feature vectors may include feature vectors that are labeled as being associated with a "key" or a "value" (e.g., a text element that the feature vector was generated from is known to be a key or a value). The set of labeled feature vectors may have been used during the training of the ML model(s), generated during previous processing runs (e.g., "real" feature vectors for "real" text elements that have been confirmed to be keys or values), combinations thereof, etc. Block 625 may include, for example, identifying, for one or more (or each) feature vector in a cluster, a nearest neighbor feature vector from a labeled set of feature vectors at block 630, and at block 635, determining whether the cluster includes keys or values by identifying which label exists the most within the identified nearest neighbors. Alternatively, block 625 may include block 633, and identifying, for each feature vector in a cluster (or for each feature vector in all clusters), a "neighbor" feature vector for a labeled set of feature vectors using a bipartite matching technique known to those of skill in the art—e.g., a minimum weighted bipartite matching technique where the sum of the values of the edges in the matching has a minimal value—and then proceeding to block 635.

The operations 600 also include, at block 640, sending (or returning) a result or an identifier of the result, the result indicating which of the text elements are keys and/or which of the text elements are values. The result may be returned to a calling entity (e.g., an entity that sent a request from block 610), which may be a calling function/code block, component, service, etc. The result may also be returned to a separate storage location, computing device, account, etc. For example, the result may be provided to a processing engine 118 such as a key-value association unit 119 that may work to associate ones of the keys with ones of the values.

In some embodiments, the information of the result indicating which of the text elements are keys and/or which of the text elements are values may be further used, for example, as part of an analysis to determine which keys are associated with which values, and/or to store the keys and/or values in a data store (e.g., a database, data structure, folder or "bucket", spreadsheet, etc.), present the keys and/or values to a user, etc.

Figure 7:
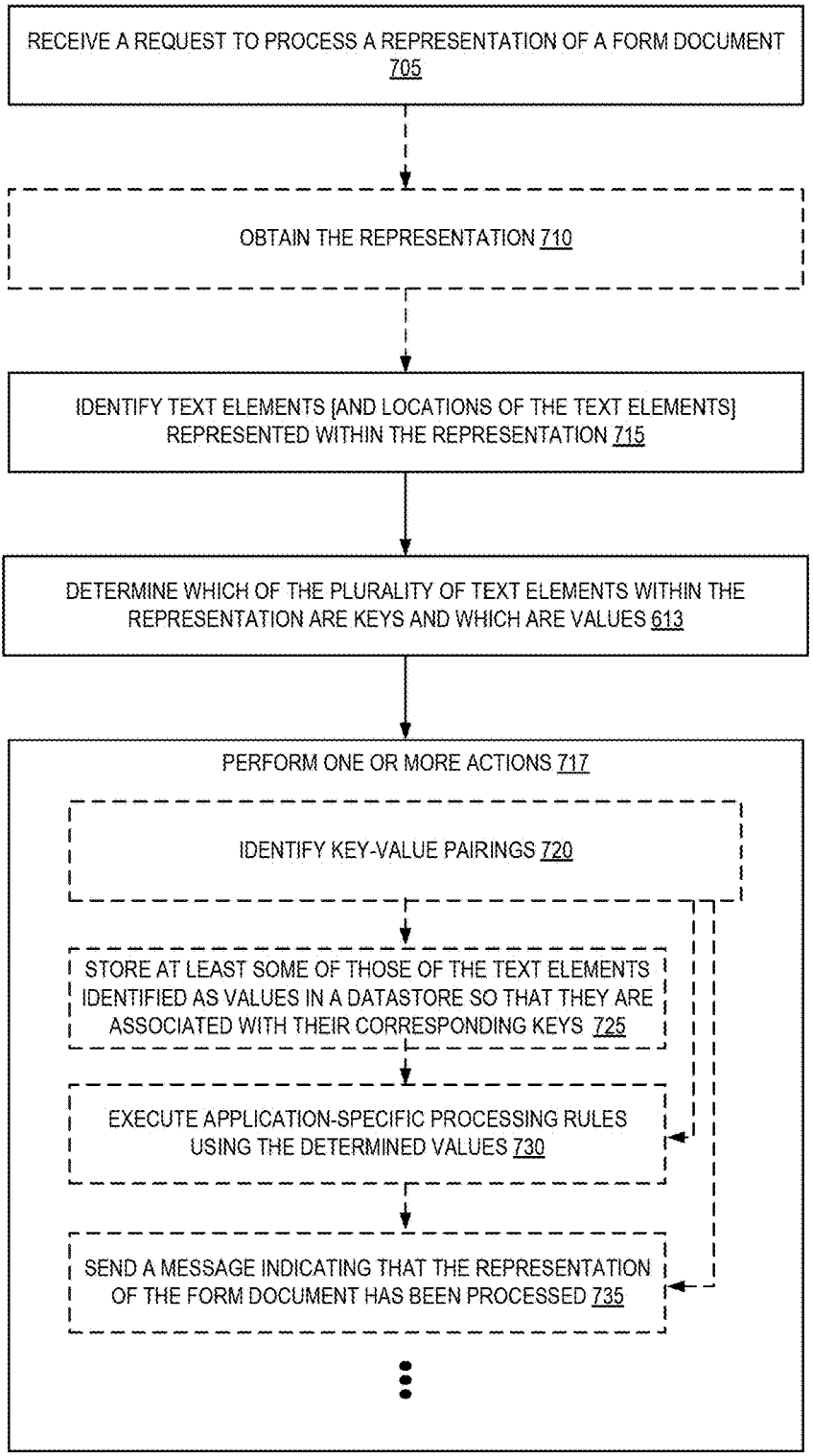
FIG. 7 is a flow diagram illustrating exemplary operations of a method for processing an electronic image including a representation of a form document according to some embodiments.

FIG. 7 is a flow diagram illustrating exemplary operations of a method for processing an electronic image including a representation of a form document according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the key-value differentiation unit 116 or the document processing service 112 of the other figures.

The operations 700 include, at block 705, receiving a request to process a representation of a form document (e.g., an image such as a JPG or PNG of a form, such as one taken by a digital camera or smartphone). The request may be received at a web service endpoint of a provider network and may be an HTTP GET request. The request may alternatively be issued by a component or service within a provider network and sent through the provider network to its destination or sent within a computing device to another module (e.g., software block or function). The request may include (or carry) the representation or may include an identifier of the representation (e.g., a URL or other storage location identifier), which can be used by the recipient to retrieve or otherwise obtain the representation—for example, the operations 700 optionally also include, at block 710, obtaining the representation. Block 710 may include issuing an HTTP GET request (or File Transfer Protocol (FTP) or other protocol) to "get" the representation from a (possibly remote) server, accessing the representation from a networked or local storage location, mounting a local or remote storage unit (e.g., a block-level storage device) to "read" the representation, etc.

At block 715, the operations 700 include identifying text elements represented within the representation. Block 715 may include analyzing the representation (e.g., with an OCR technique) to identify text elements depicted therein, reading metadata associated with the representation that includes the text elements, etc. Block 715 may also include identifying locations of the text elements, which similarly may include analyzing the representation (e.g., with an OCR technique), reading metadata, etc.

The operations 700 include, at block 613, determining which of the plurality of text elements within the representation are keys and which are values. Block 613 may include the operations described with regard to the corresponding block 613 of FIG. 6.

The operations 700 also include, at block 717, performing one or more actions. For example, optionally the one or more actions could include identify key-value pairings (e.g., associations between ones of the keys and ones of the values) at block 720, and/or storing at least some of those of the text elements identified as values in a datastore so that they are associated with their corresponding keys at block 725, executing application-specific processing rules using the determined values at block 730, and/or sending a message indicating that the representation of the form document has been processed at block 735.

Figure 8:
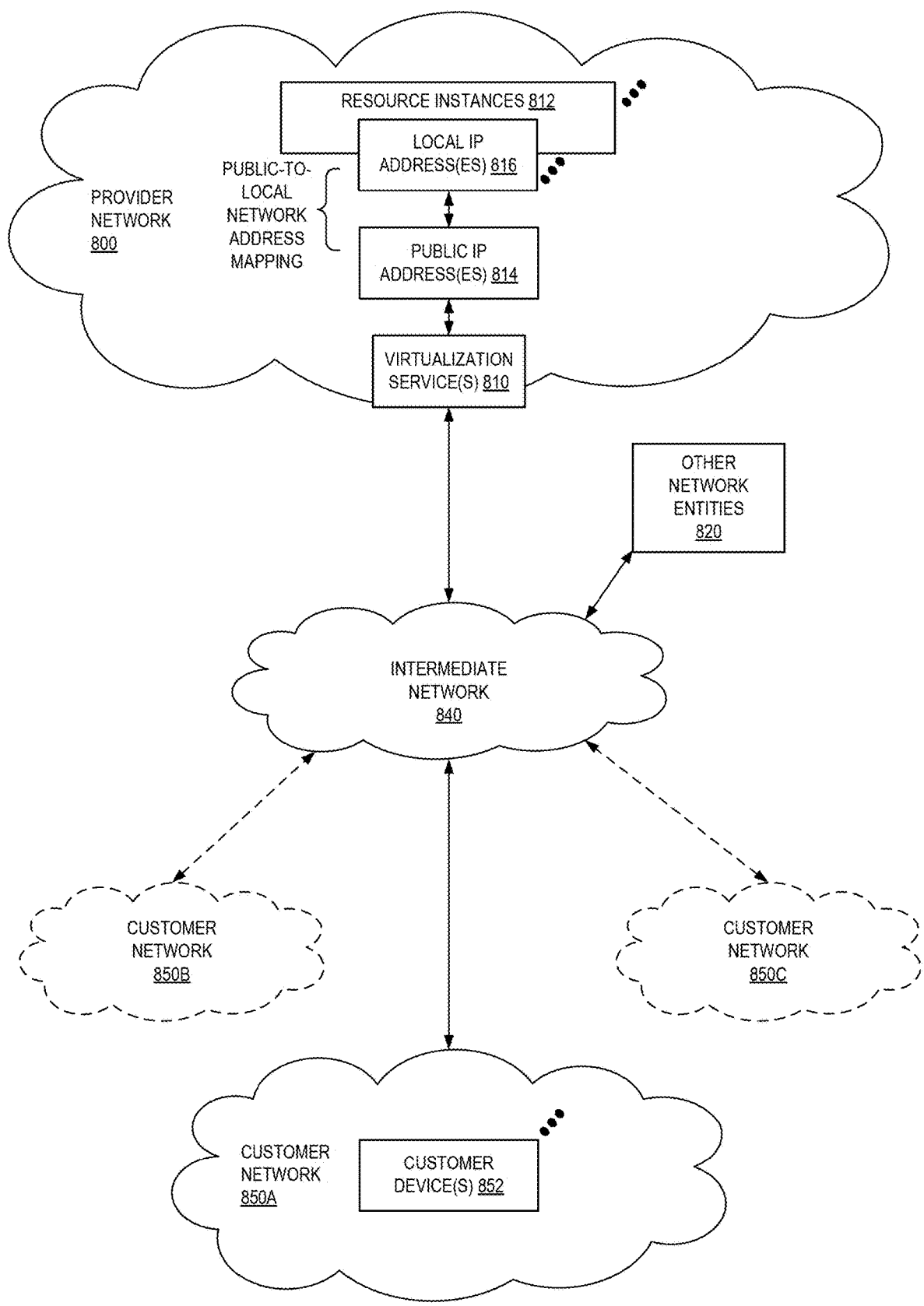
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
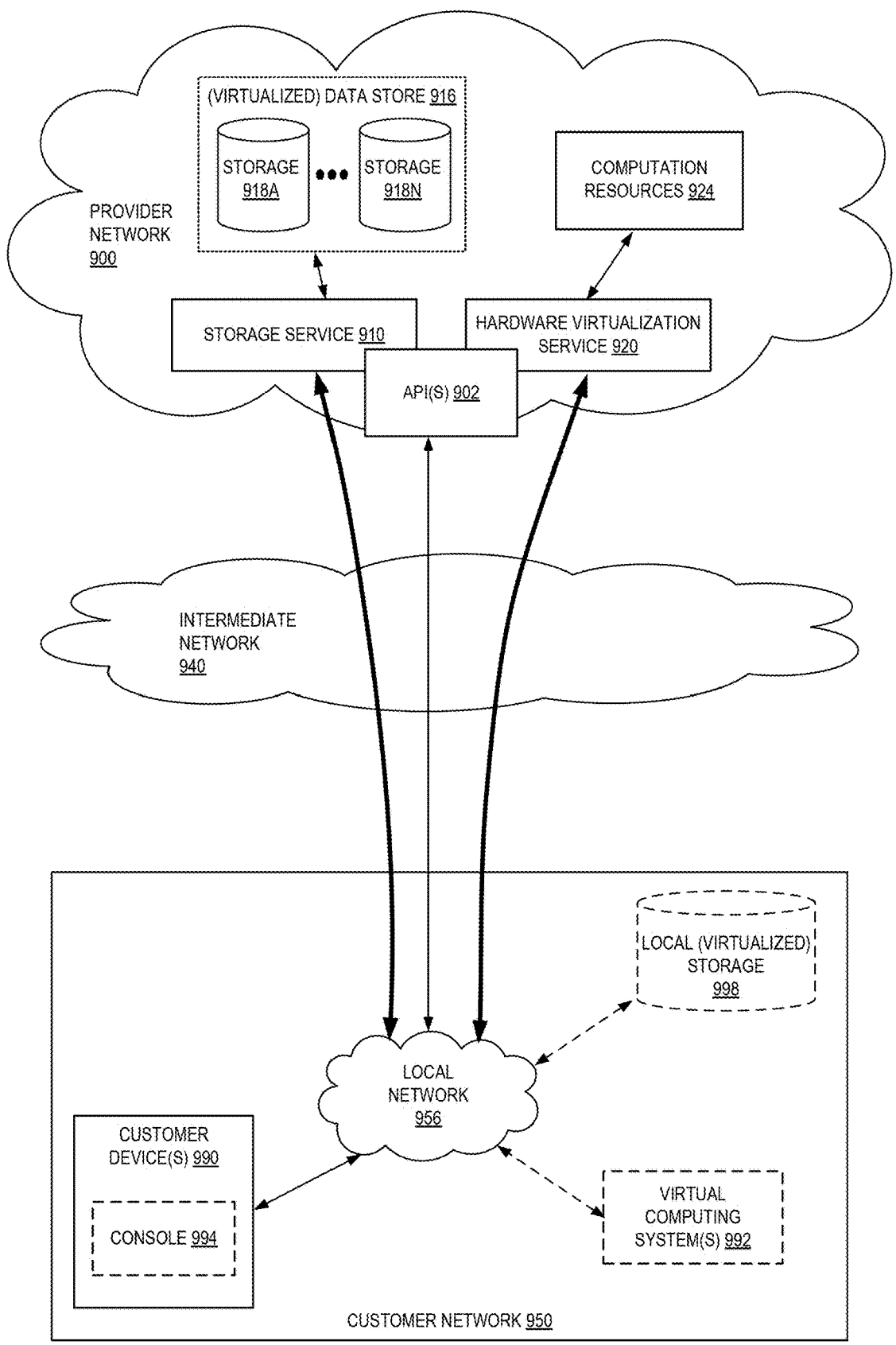
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
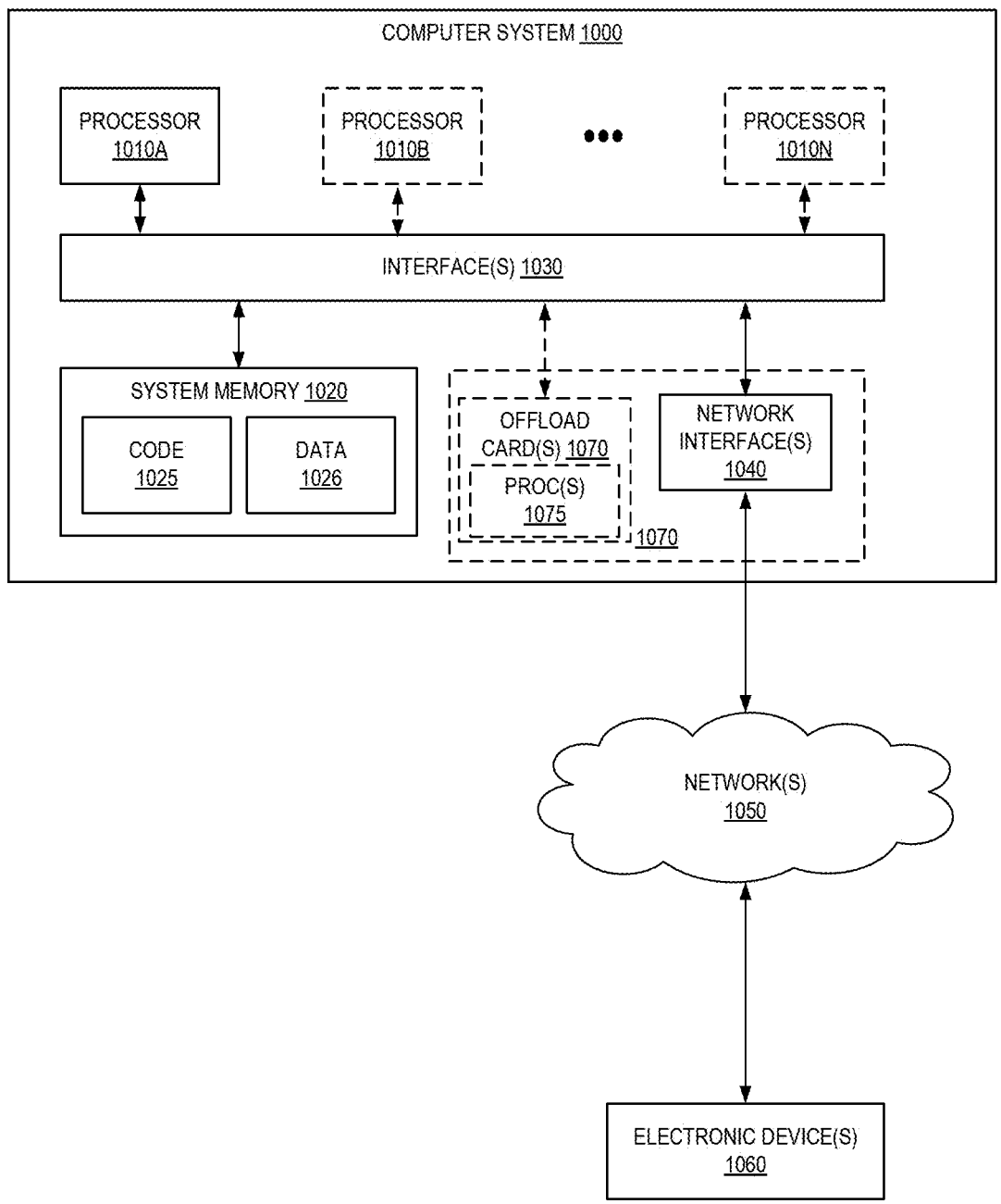
FIG. 10 is a block diagram illustrating an example computer system that may be used in some embodiments.

In some embodiments, a system that implements a portion or all of the techniques for the auto-generation of annotated real-world training data as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 110A-110N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
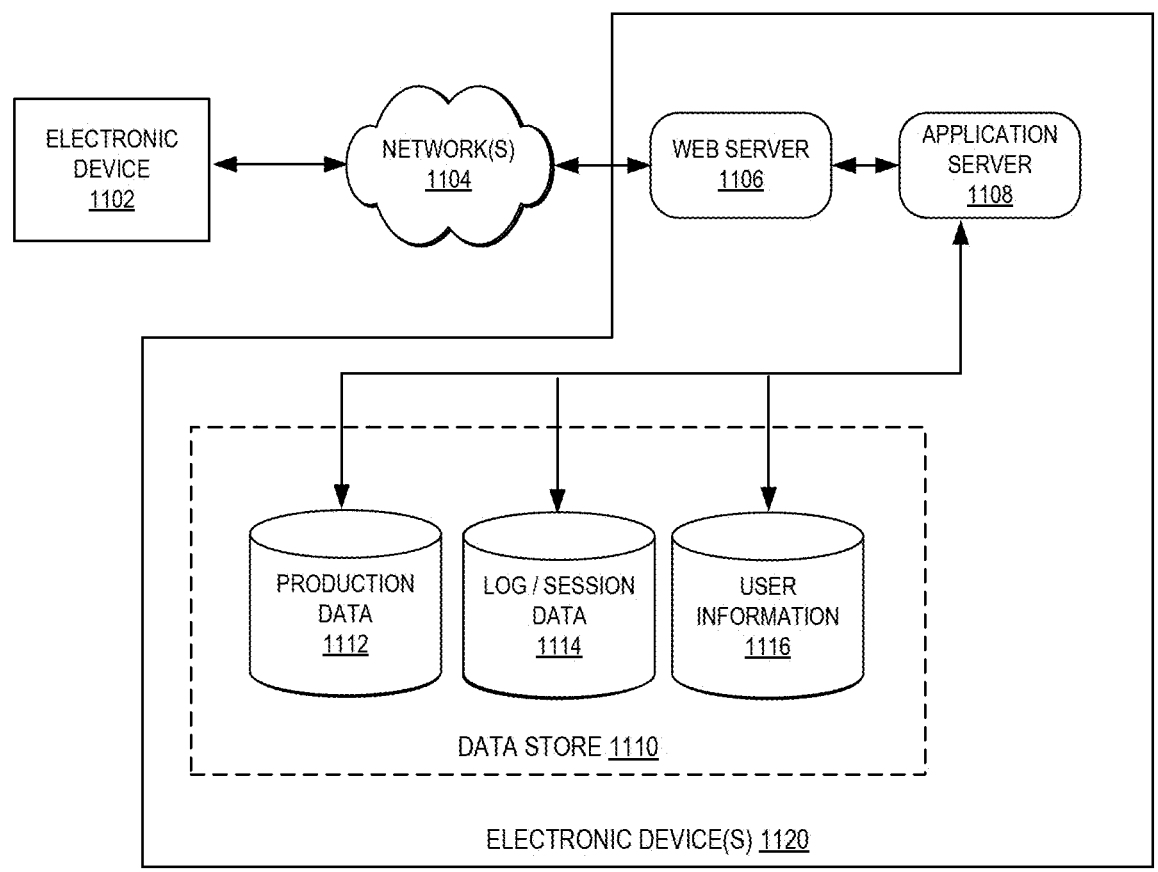
FIG. 11 illustrates an example of an environment for implementing aspects in accordance with various embodiments.

As discussed, different approaches can be implemented in various environments in accordance with the described embodiments. For example, FIG. 11 illustrates an example of an environment for implementing aspects in accordance with various embodiments. For example, in some embodiments ones of the messages originated by the client devices 104 and passing through the intermediate networks 107 as shown in FIG. 1 are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 215A-215N, 314A-314Z) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining an electronic image comprising a visual representation of a form;
   obtaining a plurality of text elements of the form represented within the electronic image and location information indicating locations of the plurality of text elements within the electronic image;
   generating, using a machine learning (ML) model, a plurality of feature vectors corresponding to the plurality of text elements, the ML model having been trained using a loss function that separates feature vectors of keys from feature vectors of values;
   clustering the plurality of feature vectors into two clusters;
   determining, for each feature vector in a first cluster of the two clusters, a neighbor feature vector from a set of labeled feature vectors stored in a data structure;
   determining a label that appears most within a set of labels of the neighbor feature vectors;
   determining, based on the label, that the first cluster includes feature vectors corresponding to keys of the form or corresponding to values of the form; and
   storing at least the values of the form in a storage location.

2. The computer-implemented method of claim 1, wherein generating the plurality of feature vectors comprises:
   for a first text element of the plurality of text elements:
      generating a plurality of per-pixel feature vectors corresponding to pixels of the first text element; and
      generating a grouped feature vector based on the plurality of per-pixel feature vectors,
         wherein a first feature vector of the plurality of feature vectors is based at least in part on the grouped feature vector.

3. The computer-implemented method of claim 2, wherein generating the plurality of feature vectors further comprises:
   generating, for each of the plurality of text elements, an embedding of the corresponding text element,
   wherein each of the plurality of feature vectors is based at least in part on a corresponding embedding, and
   wherein each of the plurality of feature vectors is further based at least in part on location information comprising one or more of a size of the corresponding text element or a location of the corresponding text element.

4. A computer-implemented method comprising:
   obtaining an electronic image comprising a visual representation of a form;
   generating, using a machine learning (ML) model, a plurality of feature vectors corresponding to a plurality of text elements of the form represented within the electronic image;
   clustering the plurality of feature vectors into at least two clusters;
   determining that a first cluster of the at least two clusters includes feature vectors corresponding to either keys of the form or values of the form; and
   storing at least the values of the form in a storage location.

5. The computer-implemented method of claim 4, wherein generating the plurality of feature vectors comprises:
   for a first text element of the plurality of text elements:
      generating a plurality of per-pixel feature vectors corresponding to pixels of the first text element; and
      generating a grouped feature vector based on the plurality of per-pixel feature vectors,
         wherein a first feature vector of the plurality of feature vectors is based at least in part on the grouped feature vector.

6. The computer-implemented method of claim 4, wherein the ML model is trained via use of a loss function that separates feature vectors of keys from feature vectors of values.

7. The computer-implemented method of claim 4, wherein the clustering of the plurality of feature vectors into at least two clusters utilizes a k-means type algorithm.

8. The computer-implemented method of claim 4, wherein determining that a first cluster of the at least two clusters includes keys of the form or values of the form comprises:
   determining a label for one or more of the feature vectors belonging to the first cluster, the determining comprising one of:
      running a nearest neighbor algorithm for each of the one or more of the feature vectors to identify another feature vector from a set of labeled feature vectors, or
      running a weighted bipartite matching algorithm between the feature vectors belonging to the first cluster and the set of labeled feature vectors.

9. The computer-implemented method of claim 4, further comprising:
   receiving, at a web service endpoint of a provider network, a request to process the electronic image, the request including the electronic image or identifying a location of the electronic image;
   identifying the plurality of text elements represented within the electronic image; and
   identifying location information for each of the plurality of text elements,
   wherein generating the plurality of feature vectors is based on the plurality of text elements and the location information.

10. The computer-implemented method of claim 4, wherein:
   the ML model is trained using a plurality of pairs of labeled text elements;
   one or more of the plurality of pairs includes a text element labeled as a key and a text element labeled as a value;

one or more of the plurality of pairs includes two text elements labeled as a key; and one or more of the plurality of pairs includes two text elements labeled as a value.

11. The computer-implemented method of claim 5, wherein generating the plurality of feature vectors further comprises:

generating, for each of the plurality of text elements, an embedding of the corresponding text element, wherein each of the plurality of feature vectors is based at least in part on a corresponding embedding.

12. The computer-implemented method of claim 8, wherein:

a plurality of labels are determined for a corresponding plurality of the feature vectors belonging to the first cluster; and the determining that the first cluster of the at least two clusters includes keys of the form or values of the form is based on identifying a label that appears most within the plurality of labels.

13. The computer-implemented method of claim 11, wherein each of the plurality of feature vectors is further based at least in part on:

location information comprising one or more of a size of the corresponding text element or a location of the corresponding text element.

14. The computer-implemented method of claim 13, wherein each of the plurality of feature vectors is of a smaller size than a size of a corresponding concatenation of the corresponding grouped feature vector, the corresponding embedding, and the corresponding location information.

15. The computer-implemented method of claim 14, wherein each of the plurality of feature vectors is generated by a procedure including:

concatenating the corresponding grouped feature vector, the corresponding embedding, and the corresponding location information to yield a first value; and projecting the first value into the feature vector, wherein the first value includes more dimensions than the feature vector.

16. A system comprising:

a storage service implemented by a first one or more electronic devices within a provider network; and a document processing service implemented by a second one or more electronic devices within the provider network, the document processing service including instructions that upon execution cause the document processing service to:

obtain an electronic image comprising a visual representation of a form from the storage service;

generate, using a machine learning (ML) model, a plurality of feature vectors corresponding to a plurality of text elements of the form represented within the electronic image;

cluster the plurality of feature vectors into at least two clusters;

determine that a first cluster of the at least two clusters includes feature vectors corresponding to either keys of the form or values of the form; and store at least the values of the form at a storage location of the storage service.

17. The system of claim 16, wherein to determine that the first cluster of the at least two clusters includes keys of the form or values of the form, the document processing service is to:

determine a label for one or more of the feature vectors belonging to the first cluster, comprising running a nearest neighbor algorithm for each of the one or more of the feature vectors to identify another feature vector from a set of labeled feature vectors.

18. The system of claim 16, wherein:

a plurality of labels are determined for a corresponding plurality of the feature vectors belonging to the first cluster; and the determination that the first cluster of the at least two clusters includes keys of the form or values of the form is based on identifying a label that appears most within the plurality of labels.

19. The system of claim 16, further comprising:

a web service endpoint implemented by a third one or more electronic devices within the provider network, the web service endpoint including instructions that upon execution cause the web service endpoint to receive a request to process the electronic image, the request including the electronic image or identifying a location of the electronic image in the storage service, wherein the document processing service further includes instructions that upon execution cause the document processing service to:

identify the plurality of text elements represented within the electronic image; and identify location information for each of the plurality of text elements, wherein the document processing service is to generate the plurality of feature vectors based on the plurality of text elements and the location information.

20. The system of claim 16, wherein:

the ML model is trained using a plurality of pairs of labeled text elements;

one or more of the plurality of pairs includes a text element labeled as a key and a text element labeled as a value;

one or more of the plurality of pairs includes two text elements labeled as a key; and one or more of the plurality of pairs includes two text elements labeled as a value.

* * * * *